Sept. 29, 1959 J. P. ECKERT, JR 2,907,006

SHIFTING REGISTER WITH INDUCTIVE INTERMEDIATE STORAGE

Filed Jan. 21, 1955

INVENTOR
JOHN PRESPER ECKERT, JR.

BY William Golman

AGENT

United States Patent Office 2,907,006

Patented Sept. 29, 1959

2,907,006

SHIFTING REGISTER WITH INDUCTIVE INTERMEDIATE STORAGE

John Presper Eckert, Jr., Philadelphia, Pa., assignor to Sperry Rand Corporation, New York, N.Y., a corporation of Delaware Application January 21, 1955, Serial No. 483,407

18 Claims. (Cl. 340—174)

The present invention relates to shifting registers, and is more particularly concerned with such devices employing magnetic amplifiers rather than vacuum tube elements.

The shifting register comprises a basic component in many present-day computing apparatuses. For instance, such components are used to obtain a physical translation of information signals within the said computing apparatus, or it may be used for obtaining a predetermined or variable type delay. In the past, such shifting registers have normally utilized vacuum tube circuitry, and the use of such circuitry has been accompanied by the disadvantages that the shifting register has been relatively large in size, has been subject to breakage, and has been further subject to normal operating failures. These foregoing factors have in the past raised serious questions in respect to disposition of components as well as of maintenance and the cost attendant thereto.

In order to reduce failures due to the foregoing difficulties, other forms of electrical devices have been suggested for use in shifting registers and one such other form is the magnetic amplifier. It is with this particular type of component that the present invention is primarily concerned. It is accordingly an object of the present invention to provide a novel shifting register utilizing magnetic amplifiers as basic components thereof.

A further object of the present invention resides in the provision of a shifting register comprising a plurality of magnetic amplifier stages utilizing inductive storage between the several stages.

A further object of the present invention resides in the provision of a shifting register which is both inexpensive to construct and which exhibits considerable ruggedness.

Still another object of the present invention resides in the provision of a shifting register which can be made in relatively small sizes.

A still further object of the present invention resides in the provision of a shifting register utilizing pulse type magnetic amplifiers in combination with inductive storage means.

The foregoing objects are achieved in the present invention by providing a shifting register comprising a plurality of magnetic amplifiers coupled to one another by means including an inductive store. In a preferred embodiment of the present invention the magnetic amplifiers are of the type known as complementing magnetic amplifiers, and in this respect a complementing amplifier is by definition one which will give an output when no input is presented thereto, or on the contrary, one which gives no output when there is in fact an input. In practice, and in the absence of a signal input to the shifting register so formed, the odd stages of my shifting register are in an output producing state, while the even stages of the said shifting register, due to the effect of the intermediate inductive storage, are in a non-output producing state. The application of a signal input to the first magnetic amplifier stage of my shifting register causes the output state of that first stage to be changed and, as will become apparent from the following discussion, this change is, through the action of the several inductive storage means utilized, successively shifted down the chain of magnetic amplifiers comprising the novel shifting register of the present invention. The change is evidenced by a change in output producing state of each of the said magnetic amplifier stages during successive time periods subsequent to the application of a signal input to the first magnetic amplifier stage.

The foregoing construction and operation of the present invention, as well as the foregoing objects and advantages of my invention, will become more readily apparent from the following description and accompanying drawings, in which.

Figure 1:
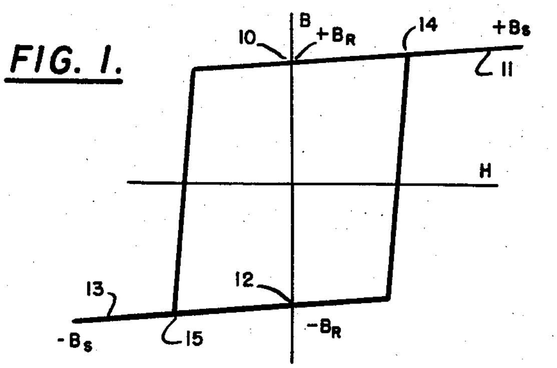
Figure 1 is an idealized hysteresis loop of a magnetic material which may preferably be employed in the cores of the magnetic amplifiers utilized in my novel shifting register.

Referring now to Figure 1, it will be seen that the magnetic amplifiers utilized in the practice of the present invention may preferably but not necessarily utilize magnetic cores exhibiting a substantially rectangular hysteresis loop. Such cores may be made of a variety of materials among which are the various types of ferrites and various kinds of magnetic tapes, including Orthonik and 4–79 Moly-permalloy. These materials may be given heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores nor to any specific magnetic materials therefor, and the examples to be given are illustrative only.

In the following description bar type cores have been utilized for ease of representation and for facility in showing winding directions. The bar type cores shown may in fact be considered to represent the end view of a toroidal core. Further, while the following description refers to the use of materials having substantially rectangular hysteresis loops, this is again merely for ease of discussion. Neither the precise core configuration nor the precise hysteretic character of the core material is mandatory and many variations will readily suggest themselves to those skilled in the art.

Returning now to the hysteresis loop shown in Figure 1, it will be noted that the curve exhibits several significant points of operation, namely, the point 10 (+Br), which represents a point of plus remanence; the point 11 (+Bs), which represents plus saturation; the point 12 (−Br), which represents minus remanence; the point 13 (−Bs), which represents minus saturation; the point 14 which represents the beginning of the plus saturation region; and the point 15 which represents the beginning of the minus saturation region.

Discussing for the moment the operation of a device utilizing a magnetic core exhibiting a hysteresis loop such as has been shown in Figure 1, let us assume that a coil is wound on the said core. If we should now further assume that the core is at its operating point 10, plus remanence, and if a voltage pulse should be applied to the said coil which produces therein a current creating a magnetomotive force in a direction tending to increase the flux in the said core (i.e. in a direction of +H), the core will tend to be driven from its operating point 10 (+Br) to its operating point 11 (+Bs). During this particular state of operation, there is relatively little flux change through the said coil and the coil therefore presents a relatively low impedance whereby energy fed to the said coil will pass readily therethrough and may be utilized to effect a usable output.

On the other hand, if the core should initially be at its operating point 12 (−Br) prior to the application of the said +H pulse, upon application of such a pulse the core will tend to be driven from the said operating point 12 (−Br) to the region of plus saturation. The pulse magnitude should preferably be so selected that the magnetic core is driven only to the beginning of the plus saturation region, namely, to the operating point 14. During this state of operation, there is a very large flux change through the coil and the coil therefore exhibits a relatively high impedance to the applied pulse. As a result, substantially all the energy applied to the coil when the core is initially at −Br will be expended in flipping the core from its operating point 12 to the region of plus saturation (preferably to the operating point 14) and thence to the operating point 10, with very little of this energy actually passing through the said coil to give a usable output. Thus, depending upon whether the core is initially at point 10 (+Br) or at point 12 (−Br), an applied pulse in the +H direction will be presented respectively with either a low impedance or a high impedance and will effect either a relatively large output or a relatively small output. These considerations are of value in the construction of magnetic amplifiers such as may be utilized in the practice of the present invention.

Figure 2:
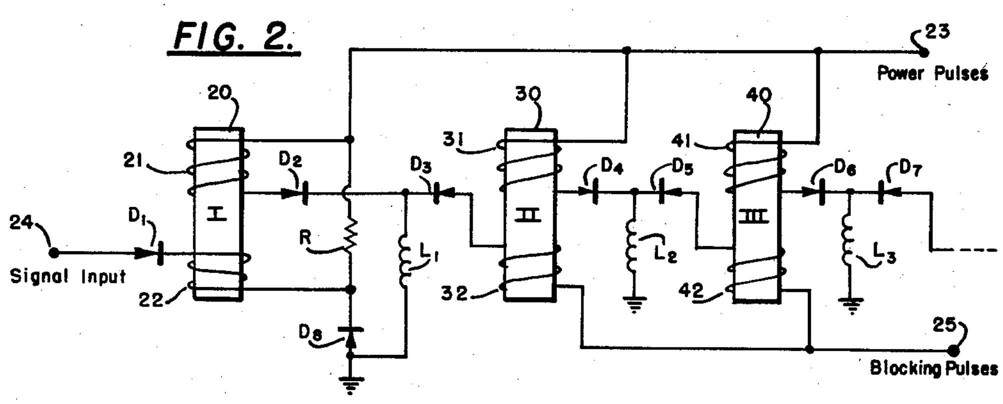
Figure 2 is a schematic representation of three stages of a shifting register utilizing magnetic amplifiers and inductive intermediate storage in accordance with the present invention.
Figure 3:
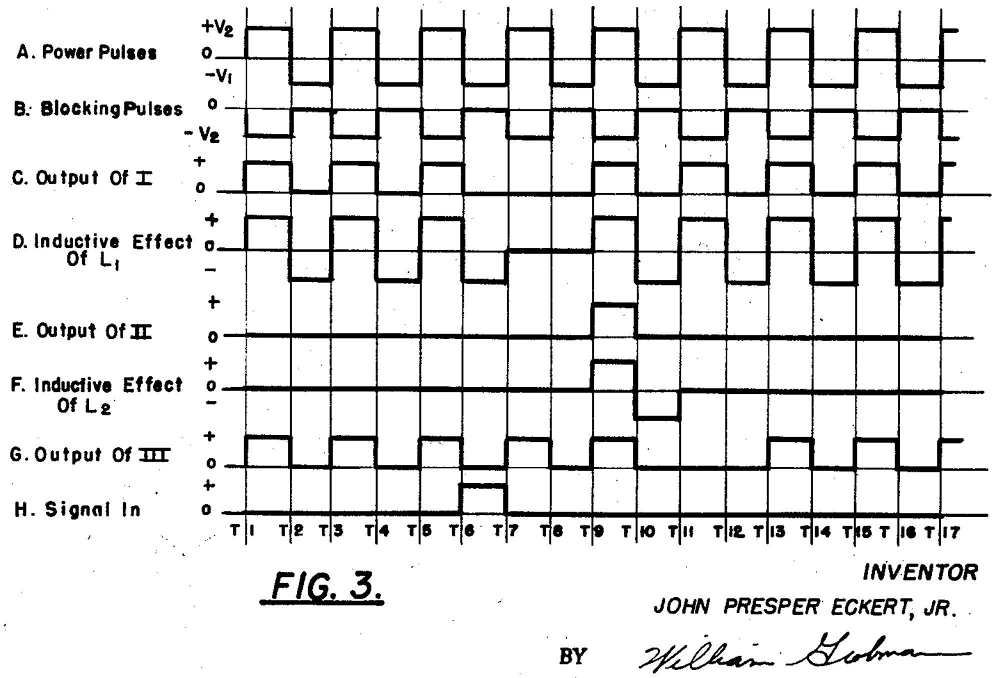
Figure 3 (A through H) are waveforms illustrating the operation of the shifting register shown in Figure 2.

Referring now to Figures 2 and 3, it will be seen that a shifting register in accordance with the present invention utilizes, inter alia, a plurality of magnetic amplifiers connected in a chain configuration. Three stages of the shifting register utilizing such magnetic amplifiers have been shown in Figure 2 and these stages comprise respectively the magnetic amplifiers I, II and III. Each of these magnetic amplifiers is a complementing amplifier and the several amplifier stages are interconnected by buffer means and by storage means which are preferably inductive in nature.

Referring to the magnetic amplifier I, let us briefly examine the construction and operation thereof. This magnetic amplifier comprises a core 20, preferably but not necessarily exhibiting a hysteresis loop similar to that discussed in reference to Figure 1. The core 20 carries two windings thereon, namely, a winding 21 which is termed the power or output winding, and a winding 22 which termed the signal or input winding. One end of the power winding 21 is coupled to a terminal 23 which terminal is supplied with a train of positive and negative going power pulses such as has been shown in Figure 3A. In the particular embodiment shown, these power pulses preferably exhibit excursions between $+V_2$ and $-V_1$ volts. The other end of the power or output winding 21 is coupled via a diode D2 to the upper end of an inductance $L_1$, and the output of the said amplifier I appears at the said upper end of inductance $L_1$ via the said diode D2. The signal or input winding 22 is coupled at one of its ends via a diode D1 to an input terminal 24 to which input terminal may be selectively coupled signal inputs which are to be shifted down the shifting register in accordance with the present invention. The lower end of input winding 22 is coupled to the junction of a resistor R and a diode D8 connected into the circuit as shown.

Examining now the operation of the magnetic amplifier I without reference to the remaining amplifier stages comprising the shifting register of the present invention, let us assume that the core 20 is initially at its plus remanence operating point 10. A positive going power pulse applied at the input terminal 23 during the time *t*1 to *t*2 for instance (Figure 3A), will cause current to pass through the winding 21 and thence through diode D2 to the output point of the said amplifier I. Inasmuch as the power winding 21 exhibits a relatively low impedance for this state of operation, an output pulse will appear at the said output point and will be developed across the impedance $L_1$ to ground with a polarity positive at the top of $L_1$ and negative at the bottom thereof. This output has been shown in Figure 3C, for instance. At time *t*2 and in the absence of any signal input, the core 20 will return to its operating point 10 (+Br) and the next positive going power pulse, applied during the time *t*3 to *t*4 for instance, will again drive the core 20 to plus saturation, again giving an output during this time interval *t*3 to *t*4. Thus, in the absence of any other inputs, and assuming the core 20 to be initially at its plus remanence operating point 10 (+Br), successive positive going power pulses will cause successive outputs to appear at the output terminal of the said amplifier I.

If we should now assume that an input pulse should be coupled from the terminal 24 via diode D1 to the input winding 22, during a time interval *t*6 to *t*7 for instance (Figure 3H), this input pulse will cause a current to flow through the diode D1, through coil 22 to the junction of resistor R and diode D8. Inasmuch as the coil 22 is wound in a direction opposite to that of coil 21, the said input pulse during time *t*6 to *t*7 will effect a −H magnetizing force on the core 20 and this magnetizing force will cause the said core 20 to be flipped in a counterclockwise direction about its hysteresis loop from its plus remanence point 10 to the operating point 15, and thence to its minus remanence operating point 12. Thus, at the time *t*7, the core 20 will find itself to be at its operating point 12 (−Br) preparatory to the reception of the next positive going power pulse applied from terminal 23, during the time *t*7 to *t*8 for instance. This next positive going power pulse finds coil 21 to present a relatively high impedance and, as a result, substantially all the energy presented by the said power pulse will be expended in merely flipping the core back to the region of point 10 via the operating point 14, rather than in producing a usable output.

Thus, as will be seen from an examination of Figure 3, the application of an input pulse during the occurrence of a negative going portion of the applied power pulses will effectively prevent the output of a usable pulse during the next succeeding positive going pulse period. The magnetic amplifier shown thus acts as a complementer. The effect discussed above can be generalized by stating that complementing magnetic amplifiers such as are utilized in the practice of the present invention will, in the absence of a signal input, produce an output pulse during the application of a positive going power pulse thereto. The output of such a complementing amplifier will be inhibited during a selected positive going power pulse if an input pulse should be applied to the signal winding thereof during a time interval immediately preceding the application of the said positive going power pulse.

Each of the magnetic amplifiers I, II and III, shown in Figure 2, are complementing magnetic amplifiers and operate substantially in accordance with the foregoing discussion. It will be noted that the signal winding 32 of amplifier II and the signal winding 42 of amplifier III appear to be wound, with respect to their cores, in a direction reverse to that of signal winding 22. As will become apparent from the subsequent discussion, however, the controlling signal current flows through the said signal windings 32 and 42 in a direction reverse to that of the signal current flow through the signal winding 22 and, therefore, the effective magnetomotive force upon the magnetic cores 30 and 40 of amplifiers II and III is the same as that produced by current flow through the signal winding 22 of amplifier I.

A further design consideration should be noted before proceeding with a discussion of the shifting register shown. As will become apparent, the passage of energy through power winding 21 for instance, due to the application of a positive going power pulse at the terminal 23 will cause a flux change to occur in the coil 21 as described, and this flux change will in turn tend to induce a voltage in the signal coil 22. This induced voltage is negative at the cathode of D1 and positive at the cathode of D8, and although the induced voltage is small if the core 20 is at its operating point 10 (+Br) when the positive going power pulse is applied, it is nevertheless necessary to prevent current from flowing in the signal winding 22 due to this small induced voltage. In respect to amplifier I, the combination of the resistor R and diode D8 accomplishes this function by allowing the lower end of signal winding 22, connected to junction of the said resistor R and diode D8, to attain the power pulse potential when the power pulse is positive. Since the base level of in input pulse as applied from terminal 24 via diode D1 is zero volts, no current can now flow due to this small induced voltage discussed previously. Further, if the core 20 should initially be at its operating point 12 (−Br) upon application of a positive going power pulse, a relatively large flux change occurs in the core 20 and a relatively large voltage will be induced in the lower winding 22. The blocking action of the R–D8 circuit still prevents current from flowing in the said lower winding 22 if there are fewer turns on signal winding 22 than there are on power winding 21. It is well known in the art that this relationship between the number of turns on the windings must exist if a voltage gain is to be produced by the amplifier. A similar blocking effect is achieved in the amplifiers II, III, etc. by the application of negative going blocking pulses from a terminal 25 to the lower ends of the signal windings 32, 42, etc. (Figure 3B). These negative going blocking pulses are applied to the said signal windings 32, 42, etc. during the occurrence of positive going power pulses to the respective power windings of the several amplifiers and perform the same blocking function discussed previously in respect to the arrangement of resistor R and diode D8.

It should further be noted that when a power pulse, such as has been shown in Figure 3A, is negative going, a current still flows in the resistor R-diode D8 circuit, the magnitude of this current being approximately $$\frac{V_1}{R}$$

This current serves to hold the end of signal winding 22 connected to the junction of resistor R and diode D8 at approximately ground potential, and, as a result, signal inputs applied via the diode D1 during a negative going power pulse portion will pass through the said diode D1, through the winding 22, as discussed previously, to the junction of resistor R and diode D8, which junction is approximately at ground potential. It should be further noted that the current which flows as a result of an input pulse through the diode D1 must produce sufficient magnetizing force to flip core 20, for instance from its plus remanence point to its minus remanence operating point, during the input pulse period. This value of current must not exceed the magnitude $$\frac{V_1}{R}$$

but this condition is easily arranged by proper choice of resistor R.

Having examined the operation of complementing magnetic amplifiers in accordance with the present invention, let us now discuss in somewhat greater detail the operation of the shifting register shown in Figure 2 and utilizing such complementing magnetic amplifiers in conjunction with inductive storage means. As was discussed previously, the output winding 21 of the amplifier I is coupled via a diode D2 to the upper end of an inductance $L_1$ and the said upper end of inductance $L_1$ is in turn coupled via diode D3, reversely poled as shown, to the signal winding 32 of amplifier II, and thence to the source of blocking pulses 25. Similarly, the output winding 31 of amplifier II is coupled via a diode D4 to the upper end of an inductance L2 and the said upper end of inductance L2 is further coupled via a diode D5, again reversely poled as shown, to the signal winding 42 of amplifier III and thence once more to the source of blocking pulses 25. The output of amplifier III may be coupled to a still further amplifier stage by the arrangement of D6, D7, and L3 shown, and in fact as many stages may be employed in the shifting register as are required by the particular utilization to be made of the said register.

Returning now to the showing of Figure 3, and assuming for the moment that no input pulses appear at the input terminal 24 of the first amplifier stage I, the said amplifier I will produce output pulses during the time intervals $t1$ to $t2$, $t3$ to $t4$, etc. in coincidence with the application of positive going power pulses thereto. During the time $t1$ to $t2$ for instance, the positive going output pulse is developed across the inductance $L_1$, the polarity being positive at the upper end of the said inductance and negative at the lower end thereof (which lower end is connected to ground as shown). During the time $t2$ to $t3$, the output pulse from amplifier I via diode D2 will cease. In accordance with well known principles, the inductance $L_1$ will tend to maintain the current flow therethrough, however, and in so doing will effectively be reversed in polarity whereby it tends to act as a source. Thus, during the time $t2$ to $t3$, inductance $L_1$ will tend to draw current from the source of blocking pulses 25 through the signal winding 32 of the amplifier II, through diode D3, and thence through the said inductance $L_1$ to ground. It will be seen that this action of inductance $L_1$ causes, in effect, a signal input to be applied to the amplifier II, during the time $t2$ to $t3$ for instance, coincident with the application of a negative going power pulse applied to the power winding 31 of the said amplifier II. Thus, so long as amplifier I is in an output producing state, the amplifier II will appear to have signal inputs thereto during appropriate time periods and will therefore be in a non-output producing state. The lack of outputs from amplifier II will therefore cause there to be a lack of signal inputs to the amplifier III, and this further stage, comprising amplifier III, will therefore be in an output producing state. Amplifier III will in turn act via diode D6, inductance L3, diode D7 and the blocking pulse source, with respect to the next succeeding amplifier stage in much the same manner as amplifier I acted with respect to amplifier II. Thus, in the absence of any signal input at the input terminal 24, stages I, III, etc. will produce output pulses while stage II, etc. will not produce output pulses. The odd numbered stages therefore are in an output producing condition while the even numbered stages are in a non-output producing condition.

If we should assume once more that a signal input is applied from terminal 24 during the time $t6$ to $t7$ (Figure 3H), the said signal input will inhibit an output from the amplifier I and there will, therefore, be no output therefrom during the time interval $t7$ to $t8$ (Figure 3C). This lack of output from amplifier I will in turn result in the inductance $L_1$ not drawing a current through the winding 32 of amplifier II during the time interval $t8$ to $t9$ and, therefore, amplifier II will produce an output pulse during the time interval $t9$ to $t10$ (Figure 3E). This output pulse from amplifier II will in turn cause an inductive "kick" by the inductance L2 during the time interval $t10$ to $t11$, whereby a signal current is drawn through the signal winding 42 of amplifier III during the time period $t10$ to $t11$ inhibiting any output from the said amplifier III during the time interval $t11$ to $t12$. By analogy, it will be seen that this lack of output from the odd stage III will permit an output from the next succeeding even stage, etc.

The application of an input pulse during the time $t6$ to $t7$ causes a change in output state of amplifier I during the time interval $t7$ to $t8$, which in turn causes a further change in the output state of amplifier II during the time interval $t9$ to $t10$, which in turn causes a still further change in the output state of the amplifier III during the time interval $t11$ to $t12$, etc. Thus, the application of an input pulse is characterized by a change in output condition of each of the amplifiers comprising the shifting register of the present invention, and these changes in output condition occur during later and later time intervals, as the effect of the input pulse proceeds down the chain of amplifier devices under the control of successively applied power pulses. The overall arrangement thus acts as a shifting register and provides a delay effect to an input pulse, the amount of which delay is dependent upon the number of stages comprising the shifting register as well as upon the time of occurrence of the applied power pulses.

While I have described a preferred embodiment of the present invention, many variations will readily suggest themselves to those skilled in the art. Thus, while the present invention has employed magnetic amplifier devices, the principles of intermediate storage discussed above may be utilized with other amplifier types such as electronic, semi-conductor, etc. amplifiers. Other forms of intermediate storage may also be employed, including delay line elements wherein both inductors and capacitors may be used together in the storage transfer link. This latter arrangement is in fact more efficient and requires less power than pure inductive storage. In addition, the precise magnetic amplifier shown is merely illustrative and such amplifiers may in fact take a number of different forms which are all within the scope of the present invention. In this respect, for instance, reference is made to the copending application of Theodore H. Bonn and Robert D. Torrey, Serial No. 402,858, filed January 8, 1954, for Signal Translating Device; and to the copending application of John Presper Eckert, Jr. and Theodore H. Bonn, Serial No. 382,180, filed September 24, 1953, for: Signal Translating Device. Each of the foregoing applications has been assigned to the assignee of the instant application, and they each disclose additional forms of magnetic amplifiers which may be readily applied in the practice of the instant invention. It should further be noted that the present invention may be practiced with both complementing and non-complementing amplifiers and, in this respect, a non-complementing amplifier is defined as one which produces an output pulse only in response to the application of an input pulse thereto. When magnetic amplifiers are utilized, they may assume either "series" or "parallel" type configurations, and reference is made to the copending applications, identified above, for more detailed discussions of these differing amplifier types.

Still further variations will suggest themselves to those skilled in the art, in accordance with the principles discussed above, and these variations are all meant to fall within the scope of my invention as set forth in the appended claims.

Having thus described my invention, I claim:

1. A shifting register comprising a plurality of magnetic amplifiers connected in cascade, each of said amplifiers comprising a magnetic core having an input winding and an output winding thereon, a source of selective signal inputs coupled to the input winding of the first of said cascade connected amplifiers, a source of regularly occurring power pulses coupled to one end of each of said output windings, and means coupling the other end of each of said output windings to the input winding of the next succeeding amplifier in the said cascade connected amplifiers, said coupling means including a separate inductive storage element connected in shunt to the output and input windings of those of said amplifiers in preceding and next succeeding relation, said coupling means also including a unidirectional charging circuit between said output winding of said preceding amplifier and said storage element, and a unidirectional discharging circuit between said storage element and said input winding of said next succeeding amplifier.

2. The combination of claim 1 in which each of said cores exhibits a substantially rectangular hysteresis loop.

3. A shifting register comprising a plurality of magnetic amplifier stages connected in cascade, each of said amplifiers comprising a magnetic core having an input and an output winding thereon, a source of power pulses coupled to one end of each of said output windings, and means coupling the other end of each of said output windings to one end of the input winding of the next succeeding amplifier stage, said last-named means comprising a pair of series-connected oppositely poled diodes, and inductive storage means coupled from the junction point of said diodes to a point of substantially ground potential.

4. The combination of claim 3 in which said amplifiers are pulse-type complementing magnetic amplifiers.

5. The combination of claim 4 in which a source of selective signal inputs is coupled to one end of the input winding of the first of said cascade connected amplifiers, a resistor and rectifier connected in series between said one end of the output winding of the said first of said amplifiers and a point of ground potential, the other end of the input winding of the said first of said amplifiers being coupled to the junction point of said resistor and rectifier.

6. The combination of claim 5 further including a source of blocking pulses coupled to the other end of the input windings of the second and subsequent ones of said amplifiers.

7. The combination of claim 6 in which said power pulses comprise regularly occurring positive going pulses, said blocking pulses being negative going in polarity and occurring in coincidence respectively with said positive going power pulses.

8. The combination of claim 7 in which each of said cores comprises a material exhibiting a substantially rectangular hysteresis loop.

9. A shifting register comprising a plurality of amplifier stages, coupling means connecting the output of each of said stages to the input of a next succeeding stage whereby said amplifiers are effectively connected in cascade, said coupling means comprising first and second diodes having their cathodes connected together and having their anodes coupled respectively to one of said amplifier outputs and to the next succeeding amplifier input, and an inductor connected from said common cathode junction to a point of substantially ground potential.

10. The combination of claim 9 wherein each of said amplifiers comprises a magnetic amplifier energized by regularly occurring positive going power pulses.

11. The combination of claim 9 wherein each of said amplifiers comprises a pulse-type complementing magnetic amplifier.

12. The combination of claim 11 in which each of said amplifiers includes a magnetic core exhibiting a substantially rectangular hysteresis loop.

13. A shifting register comprising a plurality of cascade coupled complementing magnetic amplifiers each of which includes a magnetic core having an input winding and an output winding thereon, a source of selective signal inputs coupled to the input winding of the first of said cascade coupled amplifiers, a source of power pulses coupled to one end of each of said output windings, and separate inductive storage means respectively coupling the other end of each of said output windings to the input winding of the next succeeding amplifier stage, each of said inductive storage means including an inductor, and separate unidirectional charge and discharge circuits for said inductor connected, respectively, between said other end of said output winding of the preceding amplifier stage and said inductor, and between said inductor and said input winding of the next succeeding amplifier stage.

14. A shifting register comprising a plurality of cascade coupled complementing magnetic amplifiers each of which includes a magnetic core having an input winding and an output winding thereon, a source of selective signal inputs coupled to the input winding of the first of said cascade coupled amplifiers, a source of power pulses coupled to one end of each of said output windings, and separate inductive storage means respectively coupling the other end of each of said output windings to the input winding of the next succeeding amplifier stage, each of said inductive storage means including an inductor, and separate unidirectional charge and discharge circuits for said inductor connected, respectively, between said other end of said output winding of the preceding amplifier stage and said inductor, and between said inductor and said input winding of the next succeeding amplifier stage, said charge and discharge circuits comprising rectifiers oppositely poled to one another, and a source of blocking pulses coupled to the input windings of selected ones of said amplifiers.

15. The shifting register of claim 14 in which said magnetic cores each comprises a magnetic material exhibiting a substantially rectangular hysteresis loop.

16. A shifting register comprising a plurality of amplifier stages, coupling means connecting the output of each of said stages to the input of a succeeding stage, said coupling means comprising first and second oppositely poled rectifiers connected in series between the output and input of successive amplifier stages, inductive storage means shunt connected to the junction point of said first and second rectifiers, and means for rendering said rectifiers selectively and alternately conductive, whereby said inductive storage means is charged from the output of one of said stages when one of said rectifiers is conductive, and said storage means provides an inductive current discharge thereby to effect an input to a next succeeding stage when the other of said rectifiers is conductive.

17. The shifting register of claim 16 wherein said junction point comprises a common cathode connection of said first and second rectifiers.

18. A control circuit comprising a plurality of amplifier stages each of which has an input and an output, a plurality of separate means coupling the output of each of said stages to the input of a next succeeding stage thereby to connect said amplifier stages in cascade, each of said coupling means including a shunt-connected inductor and unilateral charge and discharge circuits for said inductor, input signal means for controlling the output state of a given one of said plurality of amplifier stages whereby an output from said given stage effects current flow via one of said unilateral charge circuits to a given one of said shunt-connected inductors, said given inductor being operative, upon cessation of said output from said given stage, to provide an inductive current discharge thereby to effect current flow via one of said unilateral discharge circuits whereby a delayed signal is applied to the input of a next succeeeding stage.

References Cited in the file of this patent

UNITED STATES PATENTS

| | | |
|---|---|---|
| 2,652,501 | Wilson | Sept. 15, 1953 |
| 2,710,952 | Steagell | June 14, 1955 |
| 2,713,674 | Schmitt | July 19, 1955 |

FOREIGN PATENTS

| | | |
|---|---|---|
| 730,165 | Great Britain | May 18, 1955 |

OTHER REFERENCES

"Magnetic Shift Register Using One Core Per Bit," appearing on pages 38 to 42 of 1953 IRE National Convention Record, part 7.